(12) United States Patent
Advani et al.

(10) Patent No.: US 10,481,898 B2
(45) Date of Patent: Nov. 19, 2019

(54) AUTOMATED SOFTWARE PACKAGE DEPLOYMENT

(71) Applicant: salesforce.com, Inc., San Francisco, CA (US)

(72) Inventors: Raj Advani, Santa Ana, CA (US); Christopher Wall, Austin, TX (US); Benjamin Snyder, Oakland, CA (US); Wade Wegner, San Francisco, CA (US); Josh Kaplan, Orinda, CA (US)

(73) Assignee: salesforce.com, Inc., San Francisco, CA (US)

( * ) Notice: Subject to any disclaimer, the term of this patent is extended or adjusted under 35 U.S.C. 154(b) by 0 days.

(21) Appl. No.: 15/825,741

(22) Filed: Nov. 29, 2017

(65) Prior Publication Data
US 2019/0138289 A1    May 9, 2019

Related U.S. Application Data

(60) Provisional application No. 62/581,505, filed on Nov. 3, 2017.

(51) Int. Cl.
*G06F 8/65* (2018.01)
*G06F 8/61* (2018.01)
*G06F 8/38* (2018.01)
*G06F 8/71* (2018.01)

(52) U.S. Cl.
CPC .................. *G06F 8/65* (2013.01); *G06F 8/38* (2013.01); *G06F 8/61* (2013.01); *G06F 8/71* (2013.01)

(58) Field of Classification Search
None
See application file for complete search history.

(56) References Cited

U.S. PATENT DOCUMENTS 9,063,632 B2    6/2015  Beechuk et al.
9,350,848 B2 *  5/2016  Choi ...................... G06F 8/654
9,398,156 B2    7/2016  Snyder et al.
(Continued)

OTHER PUBLICATIONS

Adobe. "Deploy and deliver apps and updates." Adobe Enterprise, Nov. 10, 2017, <helpx.adobe.com/enterprise/using/applications.html> Accessed Jun. 25, 2018.*
(Continued)

*Primary Examiner* — Wei Y Zhen
*Assistant Examiner* — Binh Luu
(74) *Attorney, Agent, or Firm* — Nutter McClennen & Fish LLP; David J. Powsner

(57) ABSTRACT

The application pertains to the automated deployment of software packages to an enterprise's testing, staging and production environments. It does this by detecting events with respect to the enterprise's code base and, upon detection of a change in a package, identifies the application(s) that include that package. For each such application, a workflow is provided defining a pipeline of environments in which a bundle of packages that make up that application are to be installed for testing, staging or production. A software package in which an event has occurred is installed in those environments on a stepwise basis per that workflow and the application is (re)built there for testing, etc. A status of the bundle of packages that make up an application in each of the respective environments is shown in a graphical user interface.

16 Claims, 3 Drawing Sheets

(56) References Cited

U.S. PATENT DOCUMENTS

| | | | |
|---|---|---|---|
| 9,529,488 B2 | 12/2016 | Beechuk et al. | |
| 9,569,060 B2 | 2/2017 | Al-Alami et al. | |
| 9,665,261 B2 | 5/2017 | Snyder et al. | |
| 9,823,813 B2 | 11/2017 | Beechuk et al. | |
| 9,858,187 B2 | 1/2018 | Sundaravaradan et al. | |
| 9,940,411 B2 | 4/2018 | Davidchuk et al. | |
| 9,984,002 B2 | 5/2018 | Sundaravaradan et al. | |
| 10,013,501 B2 | 7/2018 | Sundaravaradan et al. | |
| 10,031,730 B2 | 7/2018 | Davidchuk et al. | |
| 10,120,848 B2 | 11/2018 | Wang et al. | |
| 2006/0036941 A1* | 2/2006 | Neil | G06F 9/451 715/234 |
| 2006/0047665 A1* | 3/2006 | Neil | G06F 9/451 707/999.01 |
| 2008/0201701 A1* | 8/2008 | Hofhansl | G06F 8/60 717/168 |
| 2012/0084769 A1* | 4/2012 | Adi | G06F 8/63 717/174 |
| 2013/0055253 A1* | 2/2013 | Jubran | G06F 9/455 718/1 |
| 2014/0032597 A1 | 1/2014 | Ellis et al. | |
| 2014/0032713 A1 | 1/2014 | Phan et al. | |
| 2014/0280329 A1 | 9/2014 | Beechuk et al. | |
| 2014/0280577 A1 | 9/2014 | Beechuk et al. | |
| 2014/0282353 A1* | 9/2014 | Jubran | G06F 8/00 717/101 |
| 2014/0310608 A1 | 10/2014 | Snyder et al. | |
| 2015/0074659 A1* | 3/2015 | Madsen | G06F 8/61 717/177 |
| 2016/0105532 A1 | 4/2016 | Tan et al. | |
| 2016/0328132 A1 | 11/2016 | Davidchuk et al. | |
| 2016/0378637 A1 | 12/2016 | Gamble et al. | |
| 2017/0068646 A1 | 3/2017 | Beechuk et al. | |
| 2017/0075540 A1 | 3/2017 | Hausler et al. | |
| 2017/0076252 A1 | 3/2017 | Hausler et al. | |
| 2017/0115829 A1 | 4/2017 | Al-Alami et al. | |
| 2017/0116125 A1 | 4/2017 | Sundaravaradan et al. | |
| 2017/0228147 A1 | 8/2017 | Snyder et al. | |
| 2017/0353458 A1 | 12/2017 | Lipke et al. | |
| 2018/0131766 A1 | 5/2018 | Wunderlich et al. | |
| 2018/0136951 A1* | 5/2018 | Palavalli | G06F 8/60 |
| 2018/0217830 A1 | 8/2018 | Bartolotta et al. | |
| 2018/0278721 A1 | 9/2018 | Wall | |
| 2018/0307466 A1 | 10/2018 | Davidchuk et al. | |

OTHER PUBLICATIONS

Oracle. "Oracle Workflow Server Installation." Oracle Application, May 8, 2012, <web.archive.org/web/20120508181306/https://docs.oracle.com/cd/A87860_01/doc/ois.817/a85441/wfins/instsu04.htm> Accessed Jun. 25, 2018.*

* cited by examiner

AUTOMATED SOFTWARE PACKAGE DEPLOYMENT

BACKGROUND OF THE INVENTION

Reference to Related Application

This Application claims the benefit of U.S. Provisional Application 62/581,505 filed on Nov. 3, 2017, entitled "Automated Software Package Deployment," the teachings of which are incorporated herein by reference in their entirety.

FIELD OF TECHNOLOGY

This pertains to digital data processing and has application, by way of example, in deployment of software packages among multiple environments.

BACKGROUND

Web application deployment can be time consuming, especially, for a large enterprise that employs numerous testing, staging and production environments. This challenge is compounded as the enterprise adds marketing and retail channels on the web, and expands its development teams to develop special-purpose apps for each of those channels. In addition to migrating an ever-growing code base through the environments, there is the added challenge of maintaining continual updates.

BRIEF DESCRIPTION OF THE DRAWINGS

A more complete understanding of the discussion that follows may be attained by reference to.

DETAILED DESCRIPTION

Figure 1:
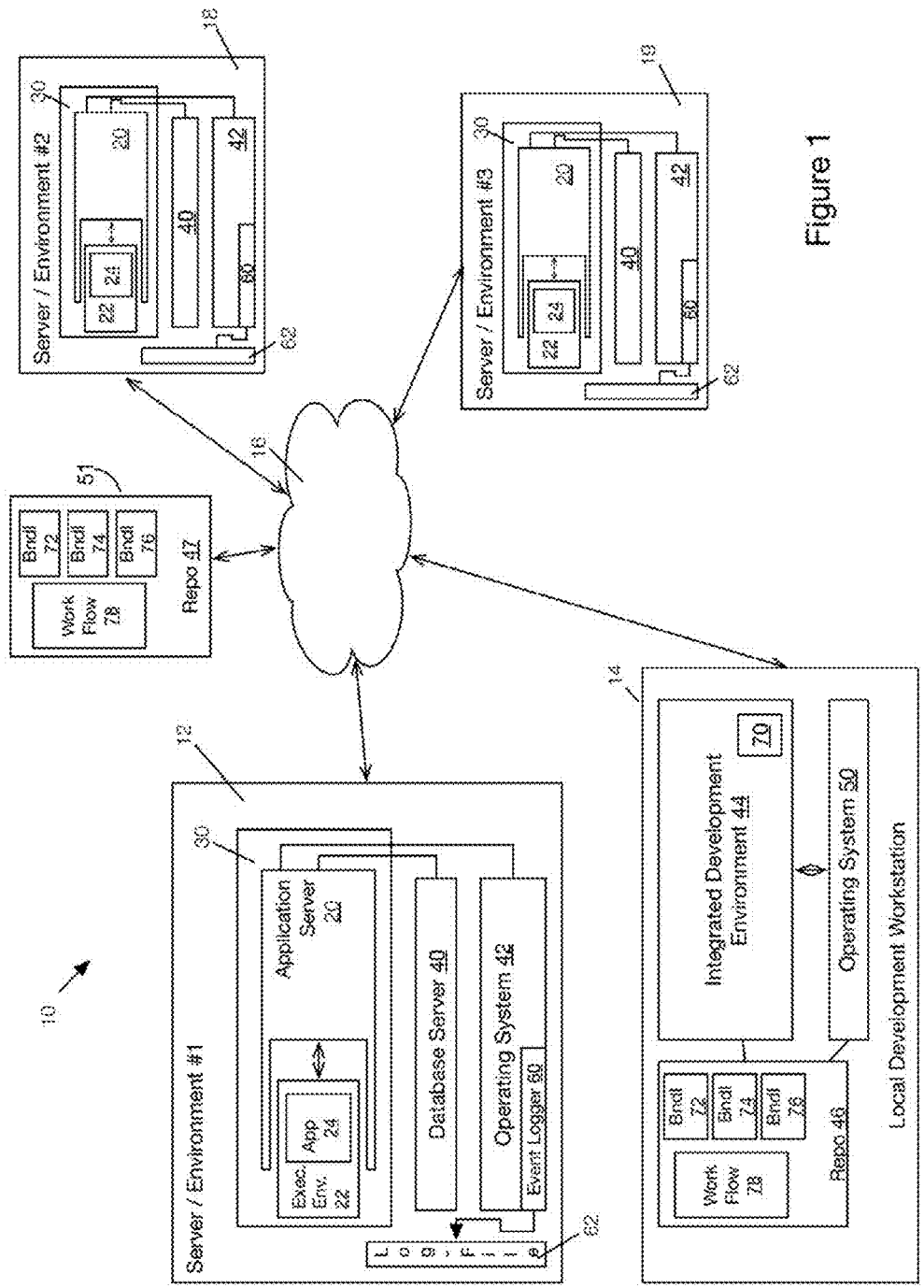
FIG. 1, which depicts an illustrative embodiment and an environment in which it is employed.

Referring to FIG. 1, illustrated system 10 includes a platform digital data processor 12 that is coupled to a developer workstation 14 via a network 16. The platform 12 provides a deployment environment—and, more specifically, by way of nonlimiting example, here, a production environment for serving software applications (here, web applications) to the public or other end users, e.g., using live data in support of an on-going business. Workstation 14 of the illustrated embodiment provides a development environment for development of those software applications. Additional platforms 18, 19 shown in the drawing also provide deployment environments—and, more specifically, by way of nonlimiting example, testing and sandbox platforms, respectively—for staging software applications during the deployment lifecycle (or "pipeline") from the development environment 14 to the production environment 12, all in the conventional manner known in the art as adapted in accord with the teachings hereof.

Platforms 12, 18, 19 comprise workstations, minicomputers, mainframes or other digital data processing devices of the type known in the art suitable for supporting production, testing, staging and/or other respective deployment environments. Those platforms, as well as the deployment environments they support, may be of the conventional types known in the art as adapted in accord with the teachings hereof. One or more of those devices may be configured as and/or to provide a database system (including, for example, a multi-tenant database system) or other system or environment. Although one or more of platforms 12, 18, 19 may be referred to as "servers," they may interoperate with one another and/or with developer workstation 14 in accord with peer-to-peer, client-server or other protocols consistent with the teachings hereof. Moreover, though three platforms 12, 18, 19 are shown in the drawing, each supporting a respective deployment environment, it will be appreciated that other embodiments may have a greater or lesser number of platforms and/or a greater or lesser number of development environments.

Device 14 comprises a conventional desktop computer, workstation, laptop computer, tablet computer, PDA, mobile phone or other digital data device of the type known in the art suitable for supporting software application development, all as adapted in accord with the teachings hereof. Like platforms 12, 18, 19, device 14 too may be configured as and/or to provide a database system (including, for example, a multi-tenant database system) or other system or environment. Likewise, although a single workstation 14 is shown and described here as supporting application development, it will be appreciated that additional such development workstations (or other computing devices) may be provided in this regard. In addition to software application development, workstation 14 of the illustrated embodiment executes software 70 supporting deployment of the software packages defining software applications to the platforms 12, 18 and/or 19, all as discussed below.

Each device 12, 14, 18, 19 comprises central processing, memory, and input/output subsections (not shown) of the type known in the art and suitable for (i) executing software providing the respective functionality described herein, and (ii) communicating over network 16 to one or more of the other devices 12, 14, 18, 19 in the conventional manner known in the art as adapted in accord with the teachings hereof. Such software, in each instance, comprises computer programs (i.e., sets of computer instructions) stored on transitory and non-transitory machine-readable media of the type known in the art as adapted in accord with the teachings hereof, which computer programs cause respective devices 12, 14, 18, 19 (and, more particularly, the central processing subsections thereof) to perform the respective operations and functions attributed thereto herein. Such machine-readable media can include, by way of non-limiting example, hard drives, solid state drives, and so forth, coupled to the respective central processors in the conventional manner known in the art as adapted in accord with the teachings hereof.

Network 14 comprises one or more networks suitable for supporting communications between devices 12, 14, 18, 19. The network comprises one or more arrangements of the type known in the art, e.g., local area networks (LANs), wide area networks (WANs), metropolitan area networks (MANs), and or Internet(s), all as adapted in accord with the teachings hereof.

The discussion that follows focuses on the development and deployment of "web" software applications. This is by way of example: other embodiments in accord with the teachings hereof, as adapted within the skill of those in the art, may be used in the development and deployment of other types of software applications.

In the illustrated embodiment supporting development and deployment of web applications, platform 12 (by way of non-limiting example) supports a production environment that executes an application server 20 providing an execution environment 22 in which a web application 24, e.g., developed on workstation 14, executes. Application server 20 comprises conventional such software known in the art (as adapted in accord with the teachings hereof) providing libraries and other reusable services that are (or can be) employed—e.g., via an applications program interface (API) or otherwise—by multiple and/or a variety of web applications, e.g., web application 24. Execution environment 22 comprises a conventional such software environment in which a web application (e.g., 24) executes on a digital data processing system, here, platform 12 and within application server 20. In instances, where the web application 24 is Java or Javascript, the execution environment 22 includes inter alia a Java virtual machine (not shown). Web application 24 comprises conventional such software known in the art (as adapted in accord with the teachings hereof) for effecting specific behavior by the platform 12 in response to requests from the workstation 14 at the behest of users thereof.

Together, application server 20, execution environment 22 and web application 24 function as a web server 30 that responds to requests in HTTP or other protocols for transferring web pages, downloads and other digital content to a requesting device, e.g., an end user computing device (not shown)—all in the conventional manner known in the art as adapted in accord with the teachings hereof. That digital content may be generated wholly from within the web server and, more typically, from within web application 24, though, it may include content sourced from elsewhere, e.g., a database platform 40 or file system (that forms part of operating system 42) executing on and/or coupled to device 12, again, in the conventional manner known in the art as adapted in accord with the teachings hereof.

Though referred to here as a web server, in other embodiments application, server 20, execution environment 22 and web application 24 may define other functionality suitable for responding to client requests for transferring digital content to a requestor over the network 16, e.g., a video platform, a music platform, or otherwise. And, though shown and discussed here as comprising an application server 20, execution environment 22 and web application 24, in other embodiments the web server 30 may combine the functionality of those in a single component or distribute it among still more components.

Digital data processor 12 and, more particularly, by way of example, operating system 42, provides an event logger 60 of the type known in the art that logs to file 62 event entries messaged by the operating system 42 and/or other software executing on the device 12. This can be event-logging functionality native to the operating system such as syslog and/or other event-logging functionality provided by middleware or other software (e.g., web application 24) executing on the device 12, all as per convention and as adapted in accord with the teachings hereof.

Application server 20 and/or environment 22 generate and message event entries to logger 60 for logging to file 62, e.g., when errors or other events (collectively, "errors") occur in connection with installation, building or execution of web application 24 in the conventional manner known in the art as adapted in accord with the teachings hereof. Such log file entries may, for example, identify the error, the operation in which that error occurred, etc., all per convention in the art as adapted in accord with the teachings hereof.

As noted above, platform 18 of the illustrated embodiment supports an environment for testing web applications during their deployment lifecycle (or pipeline) from the development environment on workstation 14 to the production environment on platform 12; platform 19 supports an environment for staging such applications during that lifecycle. In the illustrated embodiment, platforms 18 and 19 are constructed and operated similarly to platform 12, though, other embodiments may vary in this regard.

Workstation 14 (and/or other development workstations) of the illustrated embodiment provides a development platform of the type known in the art, as adapted in accord with the teachings hereof, that facilitates the creation and modification by a developer (not shown) of software packages that make up the web application 24. "Software package" is used herein in the conventional sense known in the art (as adapted in accord with the teachings hereof) to refer to a package file (or "container") for source code files and/or object code files, build, make and/or other files pertaining to compilation, linking, loading or other use of those code files, and/or directory, manifest and other metadata regarding the files.

The development platform of workstation 14 (by way of non-limiting example) includes an integrated development environment (IDE) 44 of the type known in the art (such as, for example, Eclipse), as adapted in accord with the teachings hereof, that can include a source code editor, compiler/interpreter, and debugger (again, of the type known in the art as adapted in accord with the teachings hereof), among other features. In other embodiments, the IDE 44 may be less well-featured, e.g., including only a source code editor. The IDE 44 is coupled to a source code repository ("repo") 46 of the type known in the art, as adapted in accord with the teachings hereof, that stores inter alia current and, typically, prior versions of web application 24 source code.

In some embodiments, the code base maintained in repository 46 on workstation 14 is a local copy of a master code base maintained in repository 47 hosted on a remote platform 51. That platform 51 can be a desktop computer, workstation, minicomputer, or other digital data device of the type commercially available in the marketplace, as adapted in accord with the teachings hereof. Such a platform 51 may be configured as and/or to provide a database system (including, for example, a multi-tenant database system) or other system or environment, and it may be arranged to interrelate with devices 12, 14, 18 in a peer-to-peer, client-platform or other protocol consistent with the teachings hereof. The platform 51 and/or repository 47 can include a web or other interface of the type known in the art, as adapted in accord with the teachings hereof, to facilitate synchronization of its master code base with the local code base on workstation 14, and to facilitate developer or administrator maintenance of the master code base.

IDE 44 executing on workstation 14 (and/or other development workstations of the embodiment) includes software package administration functionality 70, e.g., of the type known in the art as adapted in accord with the teachings hereof, that permits a developer, an administrator or other to build software packages from source code and other files in repository 46, 47. In other embodiments, that functionality may be run independently of the IDE 44 (and, indeed, it may run on another workstation or other computing device).

In addition to supporting package building, software 70 permits definition of (i) a bundle 72 of software packages that make up a corresponding web (or other software) application 24, and (ii) a workflow 78 specifying a pipeline of environments (i.e., the environments provided by the respective platforms 12, 18, 19) in which the packages that make up that bundle 72 are to be installed and built as part of a deployment plan for that application 24.

The workflow 78, more particularly, defines a stepwise progression of migration of the bundle 72 from one environment to a next environment (or environments) and the events required to trigger each next step of the progression. Those events can include, by way of non-limiting example, the addition of a software package to a bundle 72 identified in workflow 78 for application 24 and/or the updating of such a package through operation of the IDE 44, all as detected by the IDE 44 and/or repository 46, 47 and signaled to the functionality 70; a sign-off or other approval by a developer, administrator or other utilizing a user interface of software 70 or otherwise with respect an installation, build and/or test of such a bundle 72 on a platform specified in the workflow 78, or otherwise; all by way of non-limiting example and implementation of all of which is within the ken of those skilled in the art in view of the teachings hereof.

The bundles each comprise one or more (typically, multiple) software packages and, though three bundles 72, 74, 76 are shown in the drawing, this is for illustrative purposes and by way of example. A user interface (not shown), generated by software 70 or otherwise, may permit the developer, administrator or other to provide those definitions, graphically or otherwise (as within the ken of those skilled in the art in view of the teachings hereof), and may store those definitions to the repository 46, 47 or elsewhere, symbolically or otherwise.

Though only one workflow 78 specifying the pipeline for application 24 is shown in the drawing, this is for illustrative purposes and by way of example; additional workflows may be provided other applications and/or the same workflow 78 may be applied to multiple web (or other software) applications. As above, a user interface provided by functionality 70 or otherwise may permit the developer, administrator or other to define the workflow(s), graphically or otherwise, and may store those definitions to the repository 46, 47 or elsewhere, symbolically, by script or otherwise, all, again, as within the ken of those skilled in the art in view of the teachings hereof.

Figure 2:
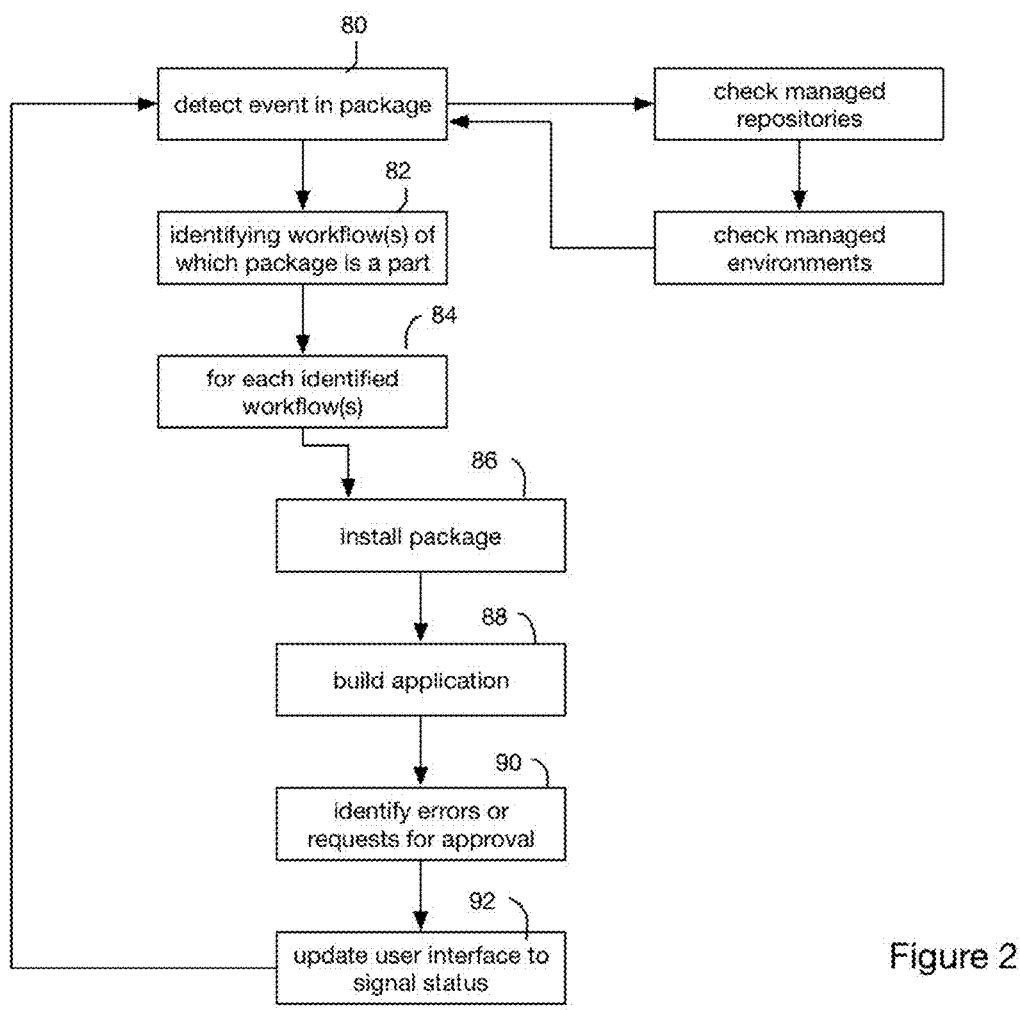
FIG. 2, which depicts operation of an embodiment shown in FIG. 1.

Operation of software 70 providing bundle deployment can be appreciated by reference to FIG. 2. In step 80, that software detects an event occurring with respect to a package that is defined as part of a bundle 72 in a workflow 68 of an application 24. Those events can include, as noted above, the addition of a package to a bundle defined in a workflow 78 for that application, the updating of such a package, an approval of a bundle 72 migrated to an environment platform 12, 18, 19 as part of that workflow or otherwise, all by way of non-limiting example. Detection of the event, as further noted above, is within the ken of those skilled in the art in view of the teachings hereof.

In step 82, the software 70 identifies one or more workflows, e.g., workflow 78, of which the package in connection with which the event was detected is a part. This can be by a search of the workflow and bundle definitions, e.g., maintained in repository 46, 47, or otherwise as within the ken of those skilled in the art in view of the teachings hereof.

As shown in steps 84-90, for each workflow 78 identified in step 82, the software 70 executes a next successive step in the stepwise progression defined for the bundle 72 in the workflow 78 by migrating the package in respect to which the event was detected to the environment platform 12, 18, 19 specified in that next successive step and installing it there (see, step 86), building the application 24 on that platform, e.g., using that migrated software package and the build files specified for that next successive step of the workflow 78 or otherwise (step 88), and identifying errors in the installation and/or build or, alternatively, seeking developer, administrator or other approval (step 92).

The migration of step 86 can be effected in the conventional manner known in the art, as adapted in accord with the teachings hereof. This can be, by way of non-limiting example, through action of file transfer tools that are present on workstation 14 and platforms 12, 18, 19 (e.g., as part of their respective operating systems, or otherwise) as mediated by action of software 70, or otherwise, all in the conventional manner known in the art, as adapted in accord with the teachings hereof. As each package is transferred to the specified environment platform 12, 18, 19, software 70 can effect its installation and application build as discussed above.

Referring again to step 90, errors signaled by the application server 20, execution environment 22, operating system or otherwise of the respective environment platform 12, 18, 19 during package installation and application build can be discerned by the software 70, e.g., via access to error log file 62 of the respective platform, or otherwise, for purposes of (i) alerting the developer, administrator or otherwise through a user interface of functionality 70 and (ii) preventing until correction further migration of the implicated software package through the pipeline specified by the workflow 78, all as is within ken of those skilled in the art in view of the teachings hereof. Conversely, in the absence of such errors, the software 70 can request developer, administrator or other sign-off/approval of the installation and build (e.g., though a user interface or otherwise) and, upon receipt of such sign-off/approval, can trigger the next stage of deployment defined in the workflow 78.

Figure 3:
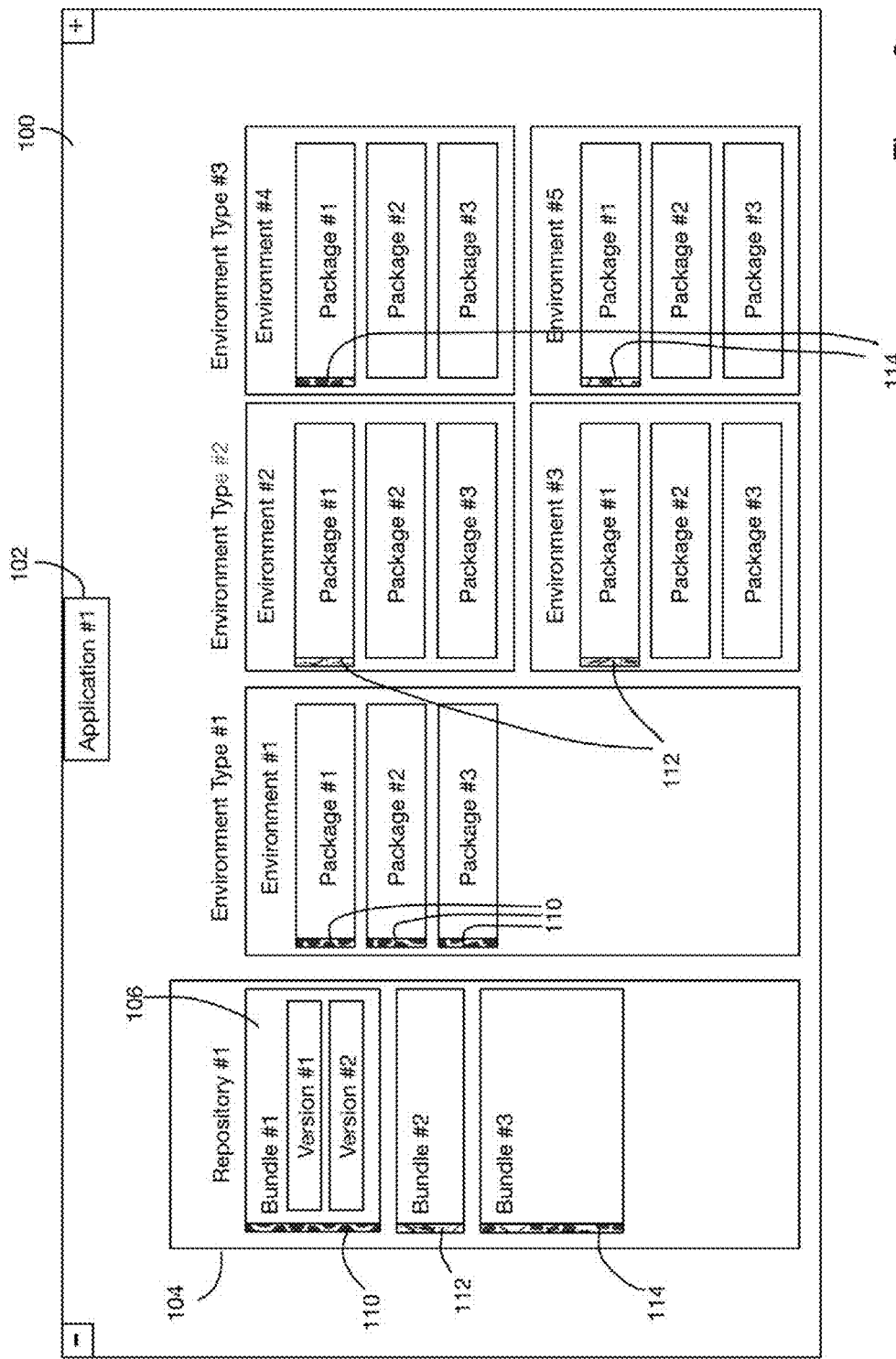
FIG. 3, which depicts a user interface effected by an embodiment shown in FIG. 1.

In step 92, the software 70 can generate and/or update a graphical user interface 100 of the type shown in FIG. 3 to signal a status of at least the software package with respect to which the event was detected (in step 80) vis-à-vis at least one software application 24 of which that package forms a part.

In the illustrated embodiment, that application 24 is identified by the software 70 in display field 102, here, as "Application #1." The software 70 also causes the interface 100 to identify, in display field 104, the repository in which the software package is stored or otherwise emanates (here, "Repository #1") and, in display field 106, the bundle 72 of which that package forms a part (here, labelled "Bundle #1"). For convenience, the identities (and, typically other information such as dates, explanatory notes, etc.) of versions of that bundle 72 are also shown by the software 70 in field 106; those versions are labelled, here, "Version #1" and "Version #2," the latter representing the current version.

The software 70 can also generate the interface 100 to identify other bundles, e.g., 74, 76, that make up the application 24 named in field 102. In the drawing, those are labelled "Bundle #2" (e.g., for bundle 74) and "Bundle #3" (e.g., for bundle 76). Each of those other bundles can define software packages that are used in conjunction with bundle 72 to make up the named application 24—or (as in the case of the illustrated embodiment) that can be used in place of that bundle 72 to make up the entirety of that application 24.

In addition to identifying, in field 104, the bundles 72, 74, 76 that include the software packages defining the application identified in field 102, the software 70 generates the interface 100 to identify the packages that make up each bundle and the presence and status of those packages in a repository 46, 47 from which the software package emanates and the environment platforms 12, 18, 19 in which such software package is installed. The software 70 generates common visual cues to tie that information together—here, by way of non-limiting example, commonly colored status bars 108. Colors are represented in FIG. 3 by stippling and referred to, as such, below.

Turning to the drawing, software 70 effects a first stippling pattern labelled 110 demarcating bundle 72 in its host repository (see field 104), as well as on the environment platforms (here, Environment #1) to which the latest version of that bundle 72 has been migrated per the workflow 78 corresponding to application 24. Thus, software 70 causes pattern 110 to appear next to the names of the software packages ("Package #1," "Package #2," and "Package #3") that make up bundle 72 in "Environment #1" (corresponding, for example, to testing platform 18) on which those packages have been installed and built per the workflow. The status of each of those packages in that environment can be shown by software 70 on the interface 100 symbolically or otherwise adjacent the stippling (or color) bar 110, adjacent the package name or otherwise.

Software 70 likewise effects a second stippling pattern labelled 112 demarcating bundle 74 in its host repository (again, see field 104), as well as on the environment platforms (here, Environment #2 and Environment #3) to which a latest version of that bundle 74 has been migrated per a workflow (not shown) defined for it vis-à-vis application 24, and a third stippling pattern labelled 114 demarcating bundle 76 in its host repository (again, see field 104), as well as on the environment platforms (here, Environment #4 and Environment #5) to which a latest version of that bundle 76 has been migrated per a workflow (not shown) defined for it vis-à-vis application 24. The statuses of the packages that make up bundles 74, 76 in those respective environments can be shown by software 70 on the interface 100, as above, e.g., symbolically or otherwise adjacent the stippling (or color) bar 110, adjacent the package name or otherwise.

Those skilled in the art will appreciate that software 70 can be implemented to effect the user interface 100 as discussed above utilizing conventional programming techniques as informed by the teachings hereof.

Those skilled in the art will appreciate that the embodiments shown in the drawings and discussed above are merely illustrative and that other embodiments are contemplated, as well. For example, although the illustrated embodiment is directed toward the development and deployment of web applications, other embodiments within the scope may provide for the development and deployment of other software applications.

In view of the foregoing, what we claim is:

1. A method of migrating a software package through a pipeline of installation environments, the method comprising detecting an event with respect to the software package, in response to detecting said event, identifying an application that includes the software package with respect to which the event was detected, and for that application, identifying at least one workflow specifying a pipeline of multiple environments in which multiple bundles of packages that make up the application are to be installed, with respect to at least one of the identified workflows, installing the software package with respect to which the event was detected in at least a first environment specified by the workflow and building the application with the installed package in at least the first environment, generating a graphical user interface representing (i) multiple bundles that define the application, (ii) software packages that make up each such bundle, and (iii) multiple environments in which those software packages of those multiple bundles are installed, wherein packages from the same bundle share a common respective visual cue, signaling, through the graphical user interface, a status of at least the software package with respect to which the event was detected in multiple environments specified by the workflow for the application.

2. The method of claim 1, the signaling step including signaling a status of each software package in multiple bundles of packages that make up the application in multiple environments specified by the workflow for the application.

3. The method of claim 1, the detecting step including detecting any of an update event and an approval event with respect to the software package.

4. The method of claim 3, the detecting step including detecting said event in any of a repository and said environment.

5. The method of claim 4, the detecting step including polling the repository and the environments to detect an event with respect to the software package.

6. The method of claim 1, the installing step including installing the software package with respect to which the event was detected in a second environment in the pipeline of multiple environments specified by the workflow for the application.

7. The method of claim 1, the signaling step including generating the common visual cue identifying each software package in multiple bundles of packages and identifying a presence and status of each such software package in a repository from which that software package emanates and in the environments in which that software package is installed.

8. The method of claim 7, the signaling step including causing the graphical user interface to identify multiple bundle of packages that make up at least one of the applications.

9. Non-transitory computer-readable media including instructions configured to cause a digital data device to perform the steps of:

detecting an event with respect to the software package, in response to detecting said event, identifying an application that includes the software package with respect to which the event was detected, and for that application, identifying at least one workflow specifying a pipeline of multiple environments in which multiple bundle of packages that make up the application are to be installed, with respect to at least one of the identified workflows, installing the software package in at least a first environment specified by the workflow, and building the application with the installed package in at least the first environment, generating a graphical user interface representing (i) multiple bundles that define the application, (ii) software packages that make up each such bundle, and (iii) the multiple environments in which those software packages are installed, wherein packages from the same bundle share a common visual cue, signaling, through the graphical user interface, a status of at least the software package with respect to which the event was detected in multiple environments specified by the workflow for the application.

10. The non-transitory computer-readable media of claim 9 including instructions configured such that the signaling step includes signaling a status of each software package in multiple bundle of packages that make up the application in multiple environments specified by the workflow for the application.

11. The non-transitory computer-readable media of claim 9 including instructions configured such that the detecting step includes detecting any of an update event and an approval event with respect to the software package.

12. The non-transitory computer-readable media of claim 11 including instructions configured such that the detecting step includes detecting said event in any of a repository and said environment.

13. The non-transitory computer-readable media of claim 12 including instructions configured such that the detecting step includes polling the repository and the environments to detect an event with respect to the software package.

14. The non-transitory computer-readable media of claim 9 including instructions configured such that the installing step includes installing the software package in a second environment in the pipeline of multiple environments specified by the workflow for the application.

15. The non-transitory computer-readable media of claim 9 including instructions configured such that the signaling step includes generating the common visual cue identifying each software package in multiple bundle of packages and identifying a presence and status of each such software package in a repository from which that software package emanates and in the environments in which that software package is installed.

16. The non-transitory computer-readable media of claim 15 including instructions configured such that the signaling step includes causing the graphical user interface to identify multiple bundle of packages that make up at least one of the applications.

* * * * *